United States Patent
Svedman et al.

(10) Patent No.: US 9,743,283 B2
(45) Date of Patent: Aug. 22, 2017

(54) METHOD AND APPARATUS FOR A HYBRID NODE IN A CELLULAR WIRELESS COMMUNICATION SYSTEM

(71) Applicants: ZTE WISTRON TELECOM AB, Kista (SE); ZTE (TX) INC., Austin, TX (US)

(72) Inventors: Patrick Svedman, Kista (SE); Aijun Cao, Kista (SE); Yonghong Gao, Kista (SE)

(73) Assignee: ZTE WISTRON TELECOM AB, Kista (SE)

( * ) Notice: Subject to any disclaimer, the term of this patent is extended or adjusted under 35 U.S.C. 154(b) by 133 days.

(21) Appl. No.: 14/655,630

(22) PCT Filed: Dec. 23, 2013

(86) PCT No.: PCT/US2013/077531
§ 371 (c)(1),
(2) Date: Jun. 25, 2015

(87) PCT Pub. No.: WO2014/107372
PCT Pub. Date: Jul. 10, 2014

(65) Prior Publication Data
US 2015/0334573 A1    Nov. 19, 2015

Related U.S. Application Data

(60) Provisional application No. 61/748,428, filed on Jan. 2, 2013.

(51) Int. Cl.
*H04W 16/06* (2009.01)
*H04L 5/00* (2006.01)
(Continued)

(52) U.S. Cl.
CPC ......... *H04W 16/06* (2013.01); *H04J 11/0073* (2013.01); *H04L 5/005* (2013.01);
(Continued)

(58) Field of Classification Search
None
See application file for complete search history.

(56) References Cited

U.S. PATENT DOCUMENTS

2002/0181444 A1\* 12/2002 Acampora ............. H04B 10/11
370/352
2005/0094600 A1    5/2005 Zhang et al.
(Continued)

FOREIGN PATENT DOCUMENTS

JP    2011-061728    3/2011
JP    2011-097225    5/2011
(Continued)

OTHER PUBLICATIONS

International Search Report and Written Opinion in International Application No. PCT/US13/77531, dated Apr. 18, 2014, in 11 pages.
(Continued)

*Primary Examiner* — Diane Lo
(74) *Attorney, Agent, or Firm* — Duane Morris LLP (57) ABSTRACT

A new approach to deployment of a hybrid node in a cellular communication network is proposed, wherein the hybrid node includes a plurality of antennas that simultaneously serve a plurality of cells in the cellular communication network by transmitting or receiving signals to or from the cells at the same time. The cellular communication network further includes a partner cell among the plurality of cells served by the hybrid node, wherein the partner cell is a soft cell that maintains communication channels with antennas of more than one node at the same time. The cellular
(Continued)

communication network further includes a hybrid cell among the plurality of cells also served by the hybrid node, wherein the hybrid cell is a hard cell that maintains communication channels with antennas of only one node at any one time. The partner cell and the hybrid cell have different cell-ids and they each connects to and serves a plurality of user equipment (UE) for uplink communication to and downlink communication from the hybrid node.

43 Claims, 9 Drawing Sheets (51) Int. Cl.
*H04L 5/14* (2006.01)
*H04J 11/00* (2006.01)
*H04W 52/24* (2009.01)
*H04W 16/32* (2009.01)
*H04W 52/14* (2009.01)

(52) U.S. Cl.
CPC .......... *H04L 5/0023* (2013.01); *H04L 5/0051* (2013.01); *H04L 5/14* (2013.01); *H04L 5/0073* (2013.01); *H04W 16/32* (2013.01); *H04W 52/143* (2013.01); *H04W 52/244* (2013.01)

(56) References Cited

U.S. PATENT DOCUMENTS

| | | | | |
|---|---|---|---|---|
| 2009/0201863 | A1* | 8/2009 | Pi | H04L 5/0091 370/329 |
| 2010/0273481 | A1* | 10/2010 | Meshkati | H04W 16/16 455/435.1 |
| 2011/0171915 | A1* | 7/2011 | Gomes | H04W 24/10 455/73 |
| 2012/0046030 | A1* | 2/2012 | Siomina | G01S 5/00 455/423 |
| 2012/0172076 | A1 | 7/2012 | Seki | |
| 2012/0213128 | A1 | 8/2012 | Miyata | |
| 2013/0301467 | A1* | 11/2013 | Kang | H04B 7/024 370/252 |
| 2013/0308542 | A1 | 11/2013 | Kang et al. | |

FOREIGN PATENT DOCUMENTS

| | | |
|---|---|---|
| JP | 2012-169699 | 9/2012 |
| WO | WO 2012/099322 | 7/2012 |
| WO | WO 2012/102483 | 8/2012 |

OTHER PUBLICATIONS

Official Action in Japanese Patent Application No. 2015-550740, dated Jun. 10, 2016, in 8 pages.

* cited by examiner

METHOD AND APPARATUS FOR A HYBRID NODE IN A CELLULAR WIRELESS COMMUNICATION SYSTEM

RELATED PATENT APPLICATIONS

This application claims benefit of priority under 35 U.S.C. §119(e) to Provisional Application No. 61/748,428, entitled "Method and Apparatus of a Hybrid Node in a Cellular Wireless Communication System," filed Jan. 2, 2013, which is incorporated by reference herein in its entirety.

FIELD OF THE INVENTION

The present invention relates generally to cellular wireless communication systems and methods.

BACKGROUND OF THE INVENTION

In many cellular radio systems, the cells are distinguished from a user equipment (UE) point of view by their cell identity numbers (cell-ids). A UE can be, but is not limited to, a mobile device. Different cell-ids often reflect different (primarily physical layer) transmission characteristics, which include but are not limited to, reference signal sequences, scrambling sequences, and synchronization signal properties. A UE can detect the cell-id of the cell it is connecting to based on certain estimated physical layer parameters and can subsequently learn other (e.g., primarily physical layer) properties for the detected cell-id. Each cell-id can be divided into multiple parts, of which one part can be detected more easily from certain physical layer parameters while another part can be read from broadcasted information.

A UE can often detect the identities of multiple nearby cells. Typically, a UE tries to connect to the cell that it identifies as the strongest in terms of transmission signal strength. In most cases, a UE is connected to only one cell at a time. When a UE is connected to a cell, the UE uses the transmission characteristics and parameters corresponding to the cell-id of the cell. In some cellular systems, a UE may connect to multiple cells at the same time, for example, during a hand-over procedure that changes cell to which the UE is connected.

An antenna serves a cell by transmitting and receiving signals related to the cell-id of the cell via the antenna. In a traditional cellular system implementation, the set of antennas serving a cell are quasi co-located, meaning that the set of antennas are roughly in the same location even if they may not occupy exactly the same physical space. One example of antenna quasi co-location is described in section 6.2.1 of 3GPP TS 36.211 V11.4.0 (2013-09), which is incorporated herein by reference. For a non-limiting example, antennas located on the same tower separated by a few meters are quasi co-located. For another non-limiting example, antennas located on the same building wall separated by a few meters are also considered as quasi co-located. For another non-limiting example, antennas located on opposite sides of a building, on the other hand, are not quasi co-located. UEs can often assume that quasi co-located antennas share some common or similar properties, such as the Doppler shift, among them. In a traditional cellular system deployment, antennas that are not quasi co-located serve cells having different cell ids.

In some cellular systems, a set of antennas that are quasi co-located can serve multiple cells. In some traditional cellular systems, however, different cells are served by different antennas even if they are quasi co-located. One example of this is a tower with quasi co-located antennas pointing in different directions, with the antennas pointing in one direction serving one cell, and the antennas pointing in another direction serving another cell.

In another kind of cellular system deployment, the antennas used for a cell are not quasi co-located. For a non-limiting example, such system can be a distributed antenna system (DAS) or a soft cell as described in, for example, Parkvall et al., "Heterogeneous network deployments in LTE", Ericsson review no 2, 2011. One example of a DAS deployment is a single cell which covers the indoors of a building with antennas distributed on different floors using long antenna feeders. One example of a soft cell deployment is a traditional high-power macro cell transmitter with antennas on a tower and a low power transmitter with street-level antennas within the coverage area of the macro cell, wherein the low power transmitter uses the same cell-id as the macro cell. One way to distinguish a DAS from a soft cell is that the distributed antennas in a DAS transmit the same signals, whereas the distributed antennas in a soft cell may transmit different signals, albeit corresponding to the same cell-id. Note that not only the antennas may be distributed in a DAS or a soft cell, other components such as radio units and baseband units may also be completely or partly distributed.

In some cellular systems, a UE can learn parameters and settings of the cellular network and the cell it connects to from common information blocks, which are periodically broadcasted by the cellular network. Such broadcasted common information applies to all UEs in connection with the cell, but the information is usually different for different cells. In some cellular systems, coherent communication is used for these common information blocks, meaning that a UE needs to receive a certain known reference (pilot) signal together with the broadcasted information blocks. The reference signal is referred to hereinafter as the common reference signal and the common broadcasted information blocks are referred to hereinafter as the broadcast channel. In some cellular systems, the common reference signal is transmitted from the same set of antennas as the broadcast channel. A UE also needs to know the relation between the mapping of the modulated symbols of the broadcast channel to the set of antennas and the mapping of the common reference signal symbols to the set of antennas. These typically linear mappings are often referred to as precoding. The precoding operation can also include antenna subset selection from the set of antennas used by the common reference signal.

The common reference signal used for the reception of the broadcast channel is often also used for other important functions, such as power measurements for UE mobility and channel quality estimation. Hence, the common reference signal as well as the broadcast channel need to be transmitted at all times (regularly and periodically) in order to provide coverage without interruption in traditional cellular communication systems.

In some cellular communication systems with variable system bandwidth, the information about the downlink and uplink system bandwidths of the cells are broadcasted. For a non-limiting example, the UEs need to know the downlink system bandwidth in order to perform measurements on the common reference signal.

UE-dedicated control and data coherent transmission to the UE can also typically be performed with the assistance of the common reference signal. Another way to communicate UE-dedicated control and data coherently is to use another reference signal than the common reference signal, hereinafter referred to as a dedicated reference signal. Typically, only the UE receiving the dedicated control or data uses the dedicated reference signal. One advantage of using a dedicated reference signal is that an arbitrary precoding could be used that is unknown to the receiving UE. The coherent reception could still work if the same unknown precoding is applied to both the dedicated reference signal and the information symbols. In this way, a precoding that is particularly suitable for the receiving UE can be selected by the transmitter, without the need to inform the receiving UE about this and the precoding operation is transparent to the receiving UE in this case. Note that the transmission parameters of the dedicated reference signal and the dedicated control or data transmission may or may not depend on the cell-id.

The description above relates to one carrier, since typically one carrier corresponds to one cell with its own cell-id. According to examples in which multiple carriers are aggregated into one aggregate sharing a cell-id, the description above is similarly applicable to the aggregate.

In a non-limiting example of a cellular system, long-term evolution (LTE), UEs can detect the LTE network by searching for the primary synchronization signals (PSS) and secondary synchronization signals (SSS), which are periodically transmitted by an LTE eNodeB (eNB). From the detection of PSS/SSS, the UE can also learn the cell identity number (cell-id). After detection of PSS/SSS, the UE can receive the Master Information Block (MIB), which is transmitted on the Physical Broadcast Channel (PBCH) and the set of System Information Blocks (SIBs), which are transmitted on the Physical Downlink Shared Channel (PDSCH). These blocks contain common information that is necessary for the UE to function in the LTE cell. For a non-limiting example, the downlink system bandwidth is signaled in the MIB and the uplink system bandwidth is signaled in the second SIB. These information blocks are periodically broadcasted in the cell. The MIB and the SIBs in LTE are examples of broadcast channels discussed above, For the demodulation of the MIB and the SIBs, the UE also needs to receive the cell-specific reference signal (CRS) transmitted over the whole downlink system bandwidth. The MIB and the SIBs are transmitted using a precoding. The precoding of the MIB is not entirely known by the UE and can be accomplished in one of a number of ways. The UE can assume that the precoding that results in a successful reception of the MIB was used at the transmitter. The CRS in LTE is an example of a common reference signal discussed above. In LTE, the demodulation of downlink control and data symbols (by a UE) can be based on either CRS (often called transmission mode 1-6) or UE-specific reference signals, also referred to as demodulation RS or DM-RS (often called transmission mode 7-9). UE-specific RS or DM-RS in LTE is an example of dedicated reference signal discussed above.

For CRS-based communication, the information symbols are advantageously transmitted from a set of antennas, from which CRS are also transmitted. Furthermore, the relation between the precoding of the CRS and the precoding of the control and data symbols is signaled to the UE. Note that the precoding of the CRS are advantageously known a priori, since they are used for receiving the broadcasted information blocks. For DM-RS based communication, the relation between the precoding of the DM-RS symbols and the precoding of the information symbols is a priori known by the receiving UE, but the precoding itself is not known or needed by the receiving UE.

Some LTE systems also use the antenna ports. One antenna port can be mapped to a multitude of antennas. For example, the CRS and broadcast channel in LTE can transmitted through two antenna ports, but eight antennas. The mapping from antenna port to antenna is transparent to the UEs.

The UEs may have different capabilities. Some UEs may be capable of downlink dedicated data and control communication based only on common reference signals. Other UEs may be capable of downlink dedicated data and control communication based only on dedicated reference signals. A third kind of UE may be capable of both. In LTE, for example, some UEs are capable only of CRS-based downlink communication. Other UEs are also capable of DM-RS based downlink communication.

SUMMARY OF THE INVENTION

In one embodiment of the invention, a hybrid node is deployed in a cellular communication network wherein the hybrid node includes a plurality of antennas that simultaneously serve a plurality of cells in the cellular communication network by transmitting and/or receiving signals to and/or from the cells at the same time. The cellular communication network further includes a partner cell among the plurality of cells served by the hybrid node, wherein the partner cell is a soft cell that maintains communication channels with antennas of more than one node at the same time. The cellular communication network further includes a hybrid cell among the plurality of cells also served by the hybrid node, wherein the hybrid cell is a hard cell that maintains communication channels with antennas of only one node at the any time. The partner cell and the hybrid cell have different cell-ids and they each connects to and serves a plurality of user equipment (UE) for uplink communication to and downlink communication from the hybrid node.

Further features and advantages of the present invention, as well as the structure and operation of various embodiments of the present invention, are described in detail below with reference to the accompanying drawings.

BRIEF DESCRIPTION OF THE DRAWINGS

The present invention, in accordance with one or more various embodiments, is described in detail with reference to the following Figures. The drawings are provided for purposes of illustration only and merely depict exemplary embodiments of the invention. These drawings are provided to facilitate the reader's understanding of the invention and should not be considered limiting of the breadth, scope, or applicability of the invention. It should be noted that for clarity and ease of illustration these drawings are not necessarily made to scale.

DETAILED DESCRIPTION OF EXEMPLARY EMBODIMENTS

The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

In the following description of exemplary embodiments, reference is made to the accompanying drawings which form a part hereof, and in which it is shown by way of illustration of specific embodiments in which the invention may be practiced. It is to be understood that other embodiments may be utilized and structural changes may be made without departing from the scope of the invention.

Generally, the invention is directed toward systems and methods for hybrid node deployment in a cellular communication network. Embodiments of the invention are described herein in the context of one practical application, namely, communication between a hybrid node and a plurality of soft and hard cells in the cellular communication network. In this context, the example system is applicable to provide downlink and uplink communications between the hybrid node and the plurality of UEs (e.g., mobile devices) via the cells. The invention, however, is not limited to such communications applications between a node and the cells it connects to, and the methods described herein may also be utilized in other applications such as mobile-to-mobile communications, wireless local loop communications, wireless relay communications, or wireless backhaul communications, for non-limiting examples.

Figure 1:
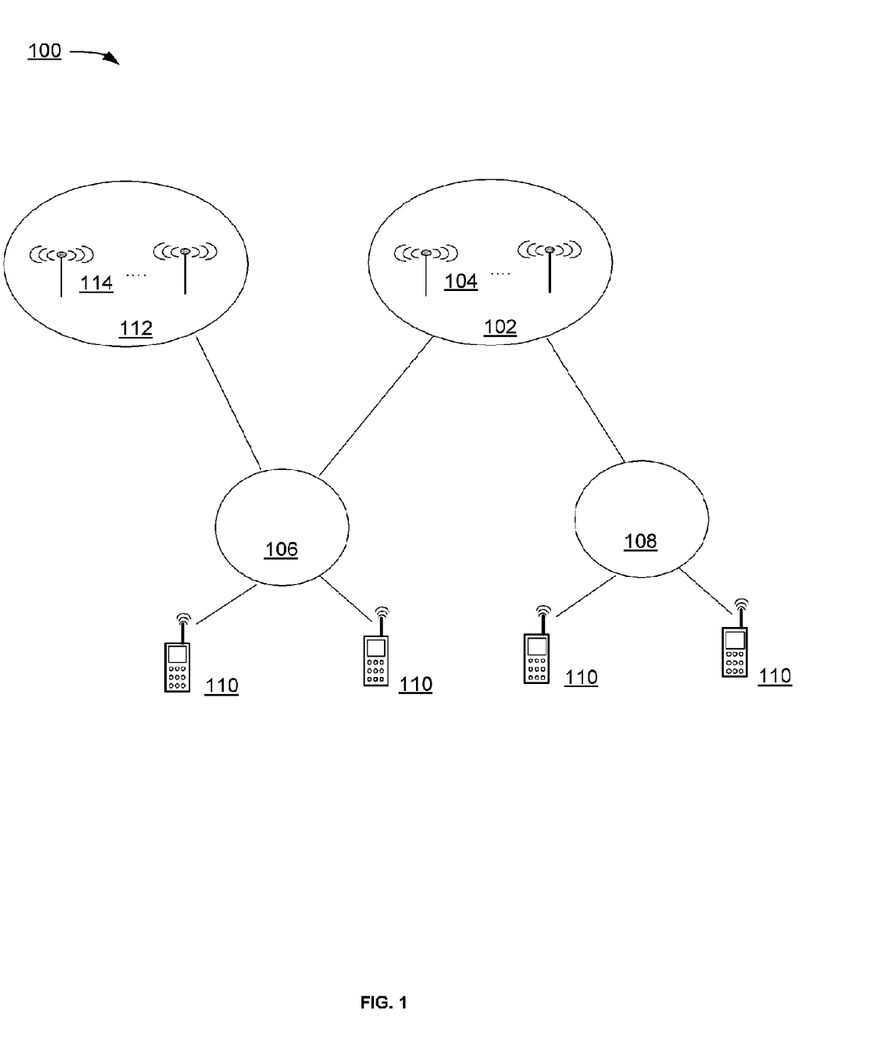
FIG. 1 depicts an example of system to support hybrid node deployment in a cellular communication network.

FIG. 1 depicts an example of system 100 to support hybrid node deployment in a cellular communication network. Although the diagrams depict components as functionally separate, such depiction is merely for illustrative purposes. It will be apparent that the components portrayed in this figure can be arbitrarily combined or divided into separate software, firmware and/or hardware components.

In the example of FIG. 1, system 100 includes a hybrid node 102, which comprises a plurality of antennas 104 that simultaneously serve a plurality of cells in various embodiments of the cellular communication network. Here, at least one of the antennas 104 of the hybrid node 102 is used to serve more than one cells by transmitting and/or receiving signals corresponding to different cell ids of the more than one cells at the same time. In the case where system 100 is a time division duplex (TDD) system, each of the antennas 104 of the hybrid node 102 can be used for either transmission or reception at any time instant. In the case where system 100 is a frequency division duplex (FDD) system, each of the antennas 104 of the hybrid node 102 can be used for both transmission and reception at any time instant. In some embodiments, the antennas 104 of the hybrid node 102 are quasi co-located at a same location even if they may not occupy exactly the same physical space.

In some embodiments, system 100 further includes at least two logical cells with two corresponding cell-ids that are served by the hybrid node 102 at the same time—partner cell 106 with partner cell-id and hybrid cell 108 with hybrid cell-id. Here, the partner cell-id and the hybrid cell-id are different. As shown in FIG. 1, both partner cell 106 and hybrid cell 108 are within the coverage area of hybrid node 102. Each of partner cell 106 and hybrid cell 108 connects to and serves a plurality of UEs (such as mobile devices) 110 for uplink and downlink communication to and from the hybrid node 102. For uplink communication, each of the partner cell 106 and the hybrid cell 108 receives uplink communication from the UEs 110 and transmits the uplink communication to the hybrid node 102. For downlink communication, each of the partner cell 106 and the hybrid cell 108 receives downlink communication from the hybrid node 102 and transmits the downlink communication to the UEs 110.

In some embodiments, partner cell 106 can be a soft cell that is capable of maintaining communication channels, corresponding to a cell-id covering an area, with antennas of more than one neighboring node at the same time. Note that the coverage area of a cell is not necessarily continuous since there can be a spot that the cell covers that is not "connected" with the rest of the coverage area. The area between the spot and the rest of the cell can be covered with another cell depending on the propagation conditions. Here, the partner cell 106 can be but is not limited to, a macro cell, a micro cell, or a pico cell in various embodiments. An example of a soft cell is described in CoMP (Coordinated Multi Point) scenario 4 in 3GPP TR 36.819 V11.2.0 (2013-09), which is incorporated herein by reference. In some embodiments, hybrid cell 108 is a regular hard cell, which maintains communication channels, corresponding to a cell-id, with antennas of only one node at any one time. In some embodiments, a UE served by a hard cell has to perform a handover from the serving cell, handled by a node, to a target cell, handled by a different node before engaging with a different node. In some embodiments, the same node handles multiple neighbor cells, for example where a macro base station serves three sectors, each being a cell. In some embodiments, a UE can simultaneously engage with different cells, for example in soft handover (Johnson, "Radio access networks for UMTS: principles and practice", John Wiley, 2008).

In the case of an LTE network, the communication band is defined by an LTE center carrier frequency and an LTE system bandwidth and the first and/or second cell-id is an LTE cell-id, which is physical cell-id (PCI) or virtual cell-id.

In some embodiments, the partner cell 106 is also served by a set of antennas of another node referred to herein as partner node 112. The antennas 114 of the partner node 112 are not quasi co-located with the antennas 104 of hybrid node 102. Here, hybrid node 102 provides soft cell operation for partner cell 106 together with the partner node 112 and both hybrid node 102 and partner node 112 use the same cell-id for partner cell 106.

Figure 3A:
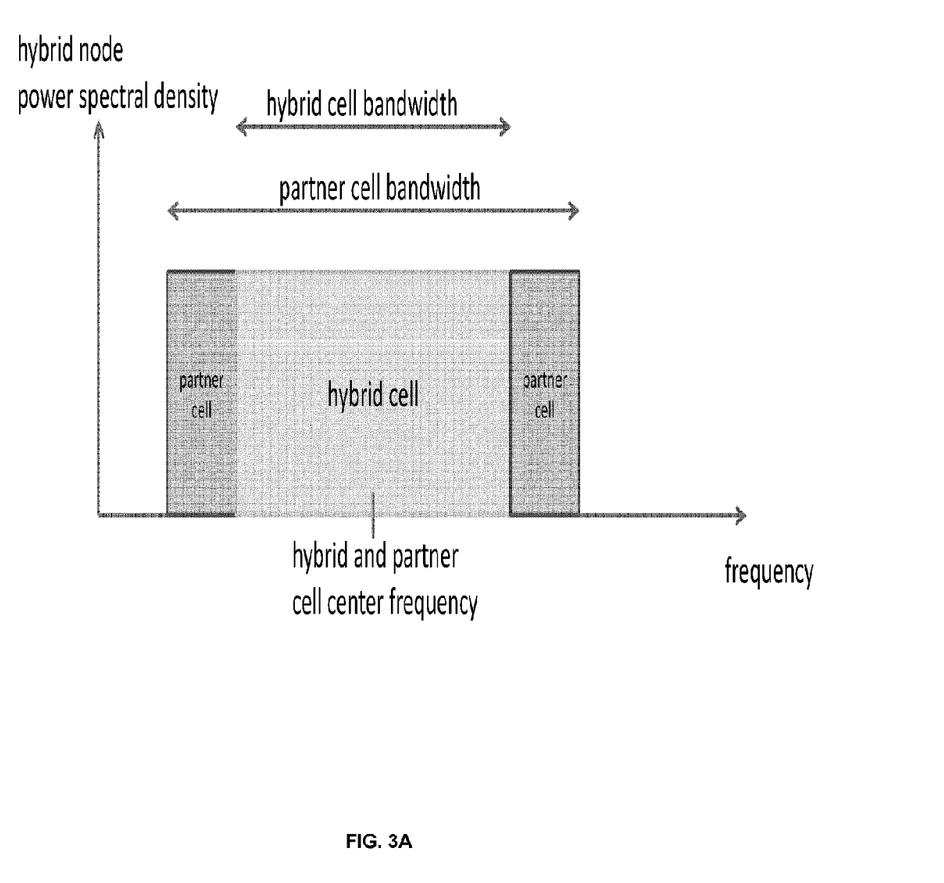
FIGS. 3A-3G depict various examples of power spectral densities and center frequencies of the communication bands between the hybrid node and the partner and hybrid cells, respectively.
Figure 3B:
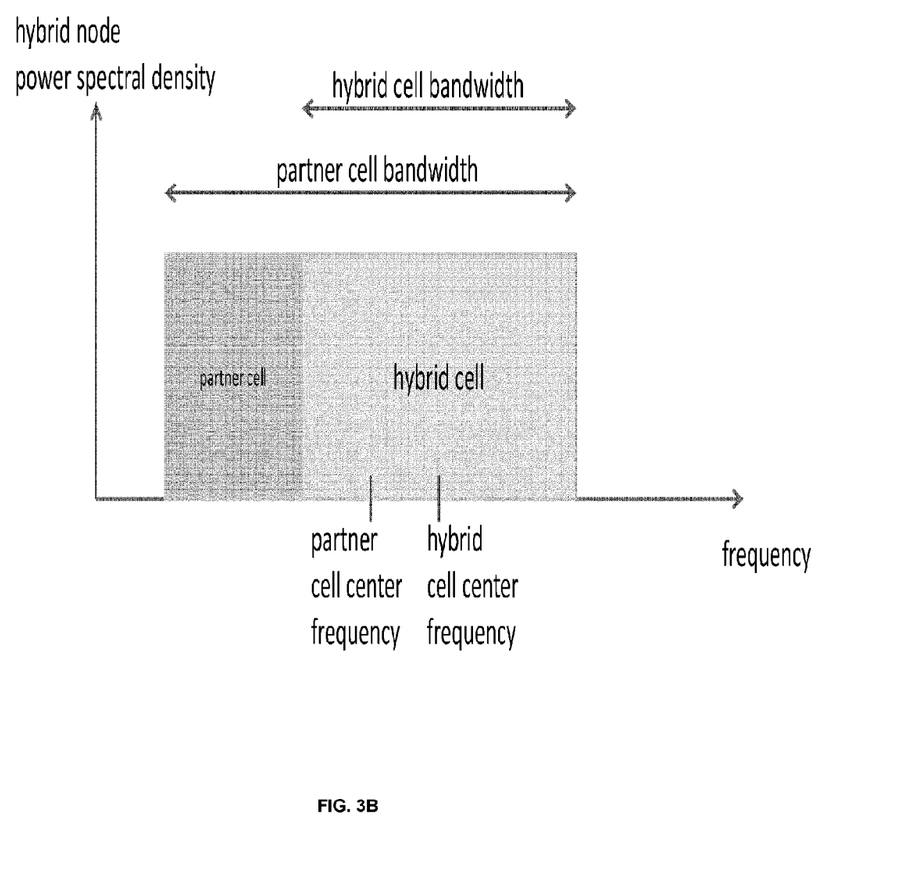

In some embodiments, the downlink communication (frequency) band of the hybrid cell 108 completely overlaps (as shown by the example in FIG. 3A) or partially overlaps (as shown by the example in FIG. 3D) with the downlink communication band of the partner cell 106. As shown in FIG. 3A, the downlink communication band of the hybrid cell 108 has the same carrier center frequency as the downlink communication band of the partner cell 106. In one alternative embodiment, the downlink communication band of the hybrid cell 108 has a different carrier center frequency from the downlink communication band of the partner cell 106 as shown by the example in FIG. 3B.

In some embodiments, the uplink communication band of the hybrid cell 108 completely or partially overlaps with the uplink communication band of the partner cell 106. In one embodiment, the uplink communication band of the hybrid cell 108 has the same carrier center frequency as the uplink communication band of the partner cell 106.

In some embodiments, the downlink and/or uplink system bandwidth of the hybrid cell 108 is no greater than the corresponding bandwidth of the partner cell 106. For a non-limiting example, the downlink and/or uplink communication bandwidth of the hybrid cell 108 is less than the corresponding bandwidth of the partner cell 106.

Figure 3C:
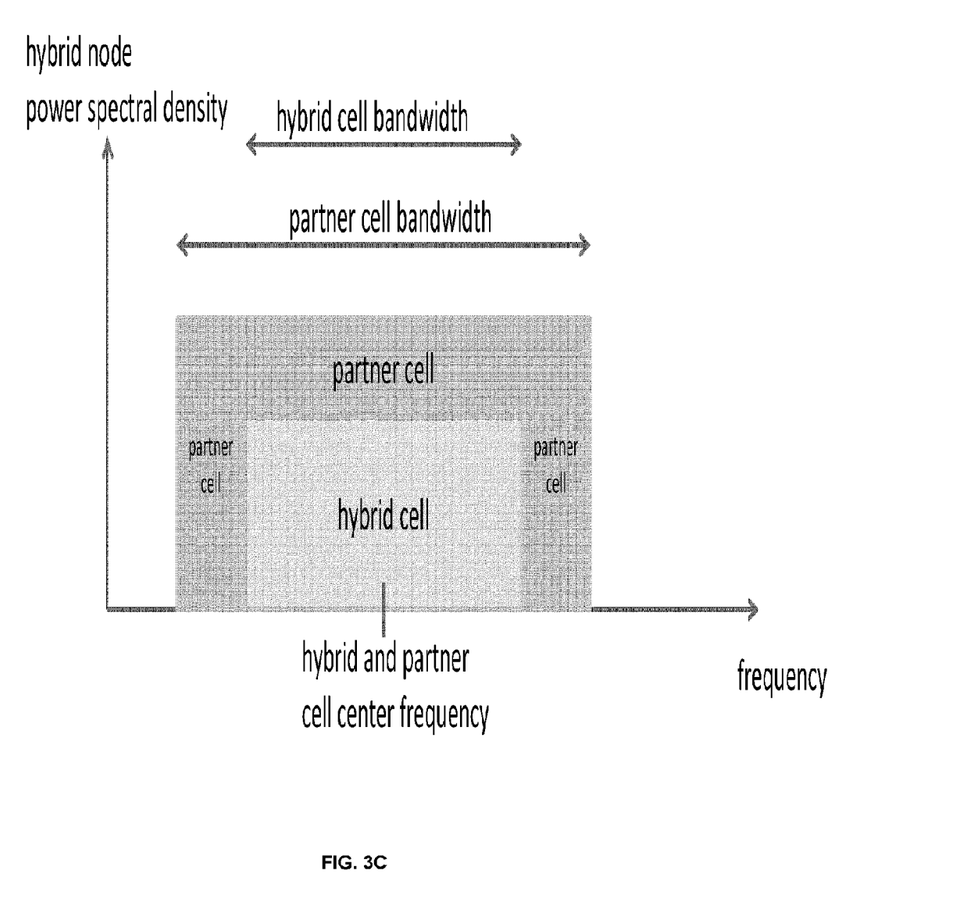
Figure 3D:
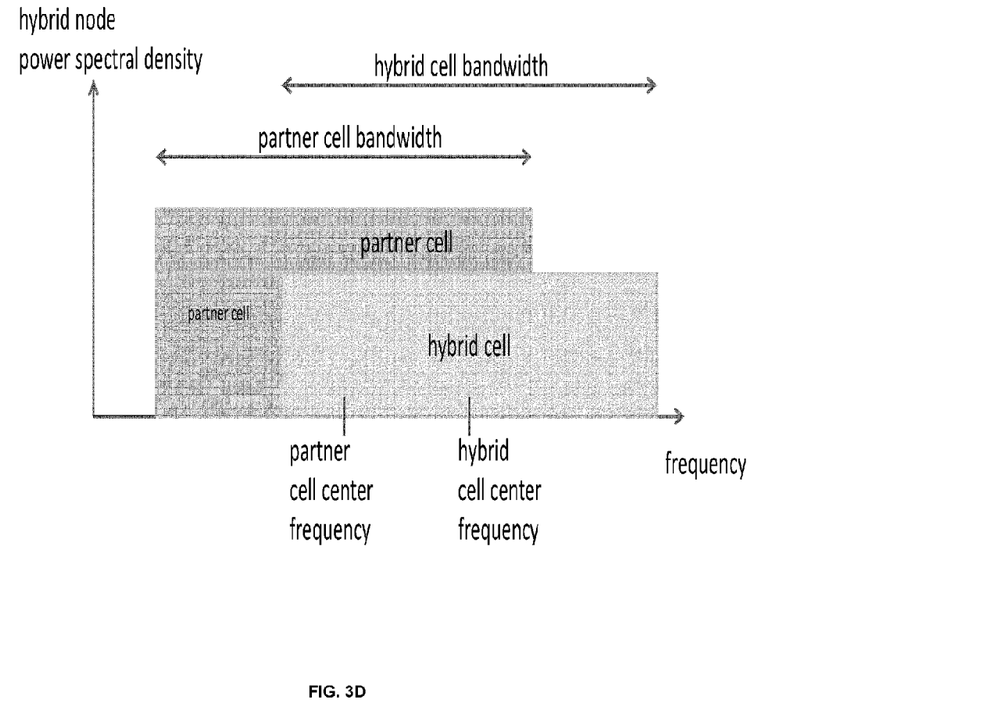
Figure 3E:
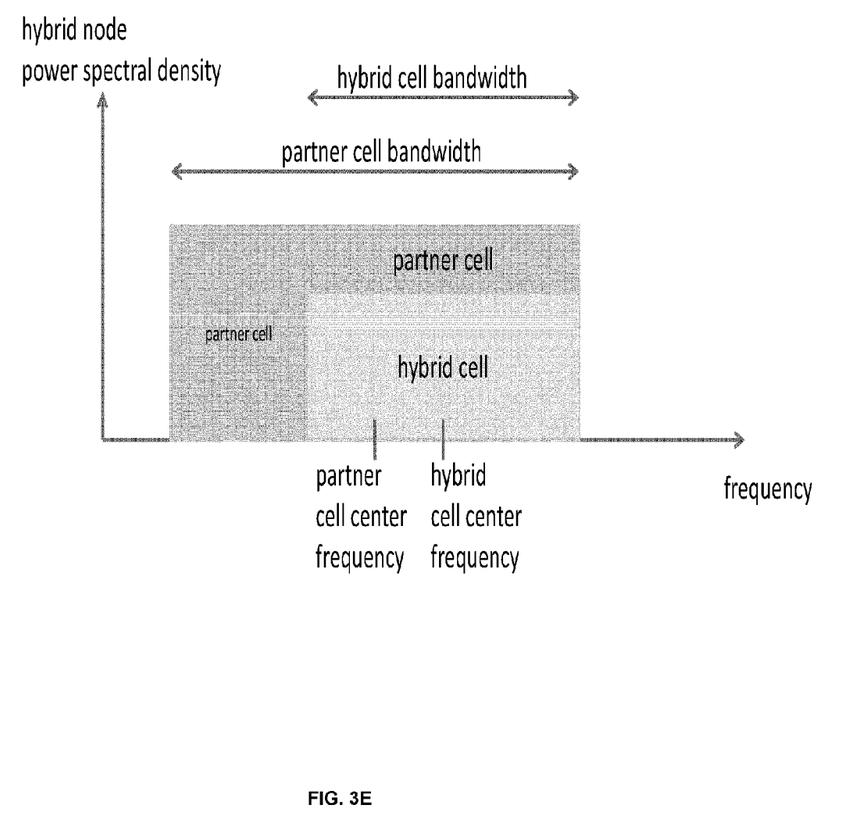

In some embodiments, under the scenario that the downlink communication bandwidth of the hybrid cell 108 is less than the downlink communication bandwidth of the partner cell 106, the hybrid node 102 transmits the signals corresponding to the hybrid cell 108 over the downlink communication band of the hybrid cell 108. The hybrid node 102 also transmits signals corresponding to the partner cell 106 mainly on the part of the downlink communication band of the partner cell 106 that is outside of the downlink communication band of the hybrid cell 108. In some embodiments, signals corresponding to the partner cell 106 can also be transmitted by the hybrid node 102 on the downlink communication band of the hybrid cell 108 as illustrated by FIG. 3C (where downlink communication bands of the partner cell 106 and the hybrid cell 108 have the same center frequency), FIG. 3E (where downlink communication bands of the partner cell 106 and the hybrid cell 108 have different center frequencies), and FIG. 3D (where downlink communication bands of the partner cell 106 and the hybrid cell 108 partially overlap), respectively. The partner cell 106 may advantageously use the entire downlink communication bandwidth of the partner cell 106 to avoid interference between the signal from the partner cell 106 and the signal from the hybrid cell 108. The hybrid node 102 may transmit a common reference signal (for example CRS in LTE) to the partner cell 106 on the part of the downlink communication band of the partner cell 106 that is not occupied by the hybrid cell 108. The hybrid node 102 may also transmit a dedicated reference signal (for example DM-RS in LTE) or other reference signals to the partner cell 106. In some embodiments, the hybrid node 102 does not transmit the common reference signal (for example CRS in LTE) to the partner cell 106. Instead, the hybrid node 102 may use a dedicated reference signal (for example DM-RS in LTE) for the partner cell 106.

In some embodiments, under the scenario that the uplink communication bandwidth of the hybrid cell 108 is less than the uplink communication bandwidth of the partner cell 106, the hybrid node 102 transmits signals corresponding to the hybrid cell 108 over the uplink communication band of the hybrid cell 108. Signals transmitted by the UEs 110 to the partner cell 106 that may interfere with the uplink communication of the hybrid cell 108 significantly can be advantageously transmitted by the hybrid node 102 mainly on the part of the uplink communication band of the partner cell 106 that is outside the uplink communication band of the hybrid cell 108. Signals corresponding to the partner cell 106 transmitted by the UEs 110 that interfere with the uplink of the hybrid cell 108 significantly can also be transmitted by the hybrid node 102 on the uplink communication band of the hybrid cell 108, which may result in additional interference between the uplink signals from the partner cell 106 and the hybrid cell 108. In some embodiments, the hybrid node 102 can use the entire uplink communication bandwidth of the partner cell 106 to transmit signals transmitted to the partner cell 106 by UEs 110 that do not interfere with the uplink of the hybrid cell 108 significantly.

Figure 3F:
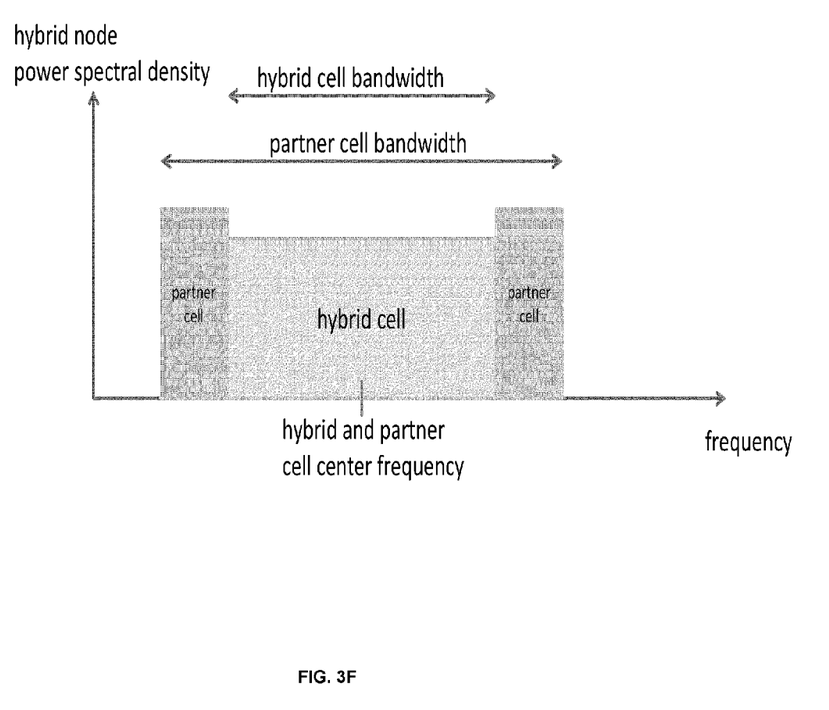
Figure 3G:
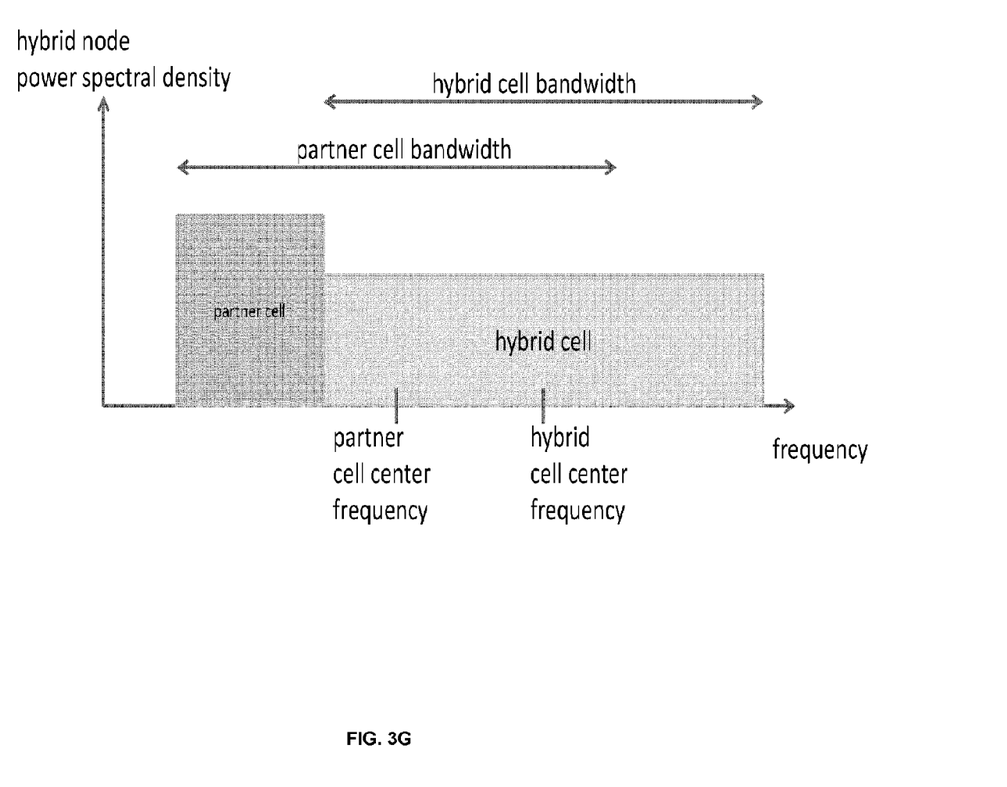

In some embodiments, the downlink transmit power spectral density from the hybrid node 102 to the hybrid cell 108 may be different from the downlink transmit power spectral density from the hybrid node 102 to the partner cell 106 as shown by the example depicted in FIG. 3F, where the downlink communication band of the hybrid cell 108 has the same carrier center frequency as the downlink communication band of the partner cell 106, and the example depicted in FIG. 3G, where the downlink communication band of the hybrid cell 108 has a different carrier center frequency from the downlink communication band of the partner cell 106. Here, the power spectral densities to the hybrid cell 108 and/or to the partner cell 106 may vary over time depending on various parameters, which for non-limiting examples, include but are not limited to, the distribution of the UEs 110 based on the different capabilities of the cells, the estimated interference situation within each of the cells, and downlink/uplink traffic load on the cells. In addition, the uplink and/or downlink communication bandwidths of the hybrid cell 108 and/or the partner cell 106 may also vary over time depending on the similar set of parameters listed above.

In some embodiments, the hybrid node 102 uses significantly lower spectral density for downlink transmission for the partner cell 106 than the partner node 112 that also serves the partner cell 106 at the same time. For a non-limiting example, the partner node 112 may transmit the signal of a macro base station to the partner cell 106 while the hybrid node 102 transmit the signal of a pico or femto or other suitable base station to the partner cell 106, which requires significantly less power than the macro base station. Under such scenario, the hybrid node 102 can advantageously be used in a heterogeneous network (HetNet) having a plurality of nodes that have different transmission powers. In some alternative embodiments, the hybrid node 102 uses the transmit power spectral density for downlink and/or uplink communication with the partner cell 106 as the partner node 112 that also serves the partner cell 106 at the same time.

In some embodiments, the hybrid node 102 provides both the hard cell and soft cell functionalities in the same node to serve the partner cell 106 and the hybrid cell 108 at the same time. In one embodiment, the hard cell communication can be done on a communication frequency other than the communication frequency for soft cell communication. This can be achieved by letting the communication bandwidth of the hard cell 108 to be smaller than the communication bandwidth of the soft partner cell 106. In one alternative embodiment, the hard cell communication can be done on the same communication frequency band as the communication frequency band for soft cell communication. Such hybrid cell functionalities provided by the hybrid node 102 offers additional flexibility to the UEs 110 communicating with the hybrid node 102. Some UEs 110 with certain capabilities may prefer to communicate with the hybrid node 102 in a soft cell mode of communication via a soft cell such as the partner cell 106, while some UEs 110 with certain capabilities may prefer to communicate with the hybrid node 102 in a hard cell mode of communication via a hard cell such as the hybrid cell 108. In the example of LTE, it may be preferable to hand over legacy UEs (e.g. release 8 UEs) to the hybrid cell 108 for hard cell communication with the hybrid node 102, while handing over other more recent UEs (e.g., release 11 UEs) to the partner cell 106 instead for soft cell communication with the hybrid node 102.

Figure 2:
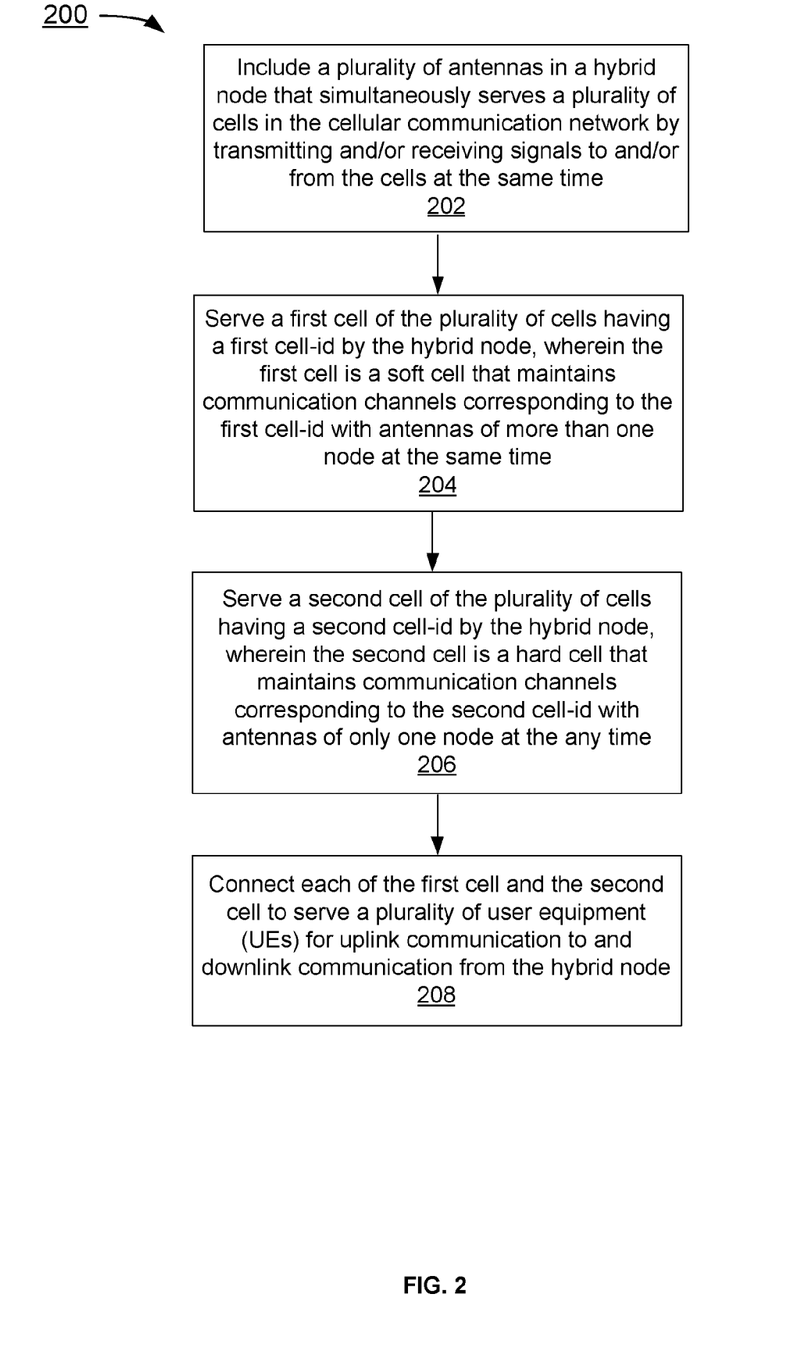
FIG. 2 depicts a flowchart of an example of a process to support hybrid node deployment in a cellular communication network.

FIG. 2 depicts a flowchart 200 of an example of a process to support hybrid node deployment in a cellular communication network. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202, where a plurality of antennas are included in a hybrid node that simultaneously serves a plurality of cells in the cellular communication network by transmitting and/or receiving signals to and/or from the cells at the same time. The flowchart 200 continues to block 204, where a first cell of the plurality of cells having a first cell-id is served by the hybrid node, wherein the first cell is a soft cell that maintains communication channels corresponding to the first cell-id, with antennas of more than one node at the same time. The flowchart 200 continues to block 206, where a second cell of the plurality of cells having a second cell-id is served by the hybrid node, wherein the second cell is a hard cell that maintains communication channels corresponding to the second cell-id covering an area, with antennas of only one node at the any time.

The flowchart 200 ends at block 208, where each of the first cell and the second cell connects to and serves a plurality of user equipment (UEs) for uplink communication to and downlink communication from the hybrid node.

While various embodiments of the invention have been described above, it should be understood that they have been presented by way of example only, and not of limitation. Likewise, the various diagrams may depict an example architectural or other configuration for the invention, which is done to aid in understanding the features and functionality that can be included in the invention. The present invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments.

One or more of the functions described in this document may be performed by an appropriately configured module. The term "module" as used herein, refers to software that is executed by one or more processors, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, one or more of the functions described in this document may be performed by means of computer program code that is stored in a "computer program product", "computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate units, processors or controllers may be performed by the same unit, processor or controller. Hence, references to specific functional units are only to be seen as references to suitable means for providing the described functionality, rather than indicative of a strict logical or physical structure or organization.

What is claimed is:

1. A system to support hybrid node deployment in a cellular communication network, comprising:
a hybrid node including a plurality of antennas that simultaneously serve a plurality of cells in the cellular communication network by transmitting or receiving signals corresponding to the plurality of cells at the same time;
a first cell of the plurality of cells having a first cell-id served by the hybrid node, wherein the first cell is a soft cell that maintains communication channels corresponding to the first cell-id covering an area, with antennas of more than one neighboring node at the same time;
a second cell of the plurality of cells having a second cell-id served by the hybrid node, wherein the second cell is a hard cell that maintains communication channels corresponding to the second cell-id, with antennas of only one node at any one time;
wherein each of the first cell and the second cell serves a plurality of user equipment (UEs) for uplink communication to and downlink communication from the hybrid node, wherein downlink and/or uplink communication band of the second cell completely or partially overlaps with downlink and/or uplink communication band of the first cell, and the antennas of the more than one neighboring node are not co-located with the plurality of antennas of the hybrid node, wherein the hybrid node is connected to a base station different from a base station to which the more than one neighboring node is connected.

2. The system of claim 1, wherein:
the first cell and the second cell are part of a heterogeneous network (HetNet) having a plurality of nodes that use different transmission powers.

3. The system of claim 1, wherein:
the plurality of antennas of the hybrid node are quasi co-located at a same location.

4. The system of claim 1, wherein:
at least one of the plurality of antennas of the hybrid node serves more than one of the plurality of cells by transmitting or receiving signals corresponding to different cell-ids of the more than one cells at the same time.

5. The system of claim 1, wherein:
each of the plurality of antennas of the hybrid node is utilized for either transmission or reception at any time in a time division duplex (TDD) system.

6. The system of claim 1, wherein:
each of the plurality of antennas of the hybrid node is utilized for transmission and reception at any time in a frequency division duplex (FDD) system.

7. The system of claim 1, wherein: the first cell-id of the first cell and the second cell-id of the second cell are different.

8. The system of claim 1, wherein:
both the hybrid node and at least one of the neighboring nodes serve the first cell using the same first cell-id.

9. The system of claim 1, wherein:
the downlink and/or uplink communication band of the second cell has the same carrier center frequency as the downlink and/or uplink communication band of the first cell.

10. The system of claim 9, wherein the system is a time division duplex (TDD) system and the downlink and uplink communication bands of the second cell have the same carrier center frequencies as the downlink and uplink communication bands of the first cell.

11. The system of claim 9, wherein the system is a frequency division duplex (FDD) system and one of the downlink and uplink communication bands of the second cell has the same carrier center frequency as one of the downlink and uplink communication bands of the first cell.

12. The system of claim 1, wherein:
the downlink and/or uplink communication band of the second cell has a different carrier center frequency from the downlink and/or uplink communication band of the first cell.

13. The system of claim 12, wherein the system is a time division duplex (TDD) system and the downlink and uplink communication bands of the second cell have different carrier center frequencies than the downlink and uplink communication bands of the first cell.

14. The system of claim 1, wherein:
the hybrid node transmits signals corresponding to the second cell on downlink communication band of the second cell, and transmits signals corresponding to the first cell on the part of the downlink communication band of the first cell that is outside of the downlink communication band of the second cell if the downlink communication bandwidth of the second cell is less than the corresponding bandwidth of the first cell.

15. The system of claim 1, wherein:
the hybrid node uses different downlink transmit power spectral densities for the first cell and the second cell.

16. The system of claim 1, wherein:
the hybrid node uses lower transmit power spectral density for downlink transmission for the first cell than the another node that also serves the first cell at the same time.

17. The system of claim 1, wherein:
the hybrid node uses the same transmit power spectral density for downlink transmission for the first cell as the another node that also serves the first cell at the same time.

18. The system of claim 1, wherein:
the hybrid node uses transmit power spectral density that varies over time depending on various parameters.

19. The system of claim 1, wherein:
the uplink and/or downlink communication bandwidths of the first cell and/or the second cell varies over time depending on various parameters.

20. The system of claim 1, wherein:
the cellular communication network is a long-term evolution (LTE) network.

21. The system of claim 20, wherein:
the communication band is defined by an LTE center carrier frequency and an LTE system bandwidth.

22. The system of claim 20, wherein:
the first and/or second cell-id is an LTE cell-id, which is physical cell-id (PCI) or virtual cell-id.

23. The system of claim 20, wherein the second cell communication band is defined by an LTE center carrier frequency and an LTE system bandwidth.

24. The system of claim 23, wherein the second cell-id is an LTE cell-id, the LTE cell-id being a physical cell-id (PCI) or a virtual cell-id.

25. The system of claim 23, wherein the second cell serves legacy LTE UEs of the plurality of UEs and the first cell serves more recent UEs of the plurality of UEs that are more recent than the legacy LTE UEs and have capabilities different from that of the legacy LTE UEs, wherein the legacy LTE UEs are configured to communicate with an LTE hard cell and the more recent UEs are configured to communicate with a soft cell.

26. The system of claim 1, wherein the first cell and the second cell have different carrier system bandwidths.

27. The system of claim 26, wherein a first cell carrier system bandwidth is larger than a second cell carrier system bandwidth.

28. The system of claim 1, wherein some signals of the first cell are transmitted inside a bandwidth of the second cell and other signals of the first cell are transmitted outside the bandwidth of the second cell and the some signals of the first cell are transmitted such that second cell interference is avoided.

29. A method to support hybrid node deployment in a cellular communication network, comprising:
including a plurality of antennas in a hybrid node that simultaneously serves a plurality of cells in the cellular communication network by transmitting or receiving signals corresponding to the plurality of cells at the same time;
serving a first cell of the plurality of cells having a first cell-id by the hybrid node, wherein the first cell is a soft cell that maintains communication channels corresponding to the first cell-id covering an area, with antennas of more than one neighboring node at the same time;
serving a second cell of the plurality of cells having a second cell-id by the hybrid node, wherein the second cell is a hard cell that maintains communication channels corresponding to the second cell-id, with antennas of only one node at any one time, wherein downlink and/or uplink communication band of the second cell completely or partially overlaps with downlink and/or uplink communication band of the first cell; and
connecting each of the first cell and the second cell to serve a plurality of user equipment (UEs) for uplink communication to and downlink communication from the hybrid node,
wherein the antennas of the more than one neighboring node are not co-located with the plurality of antennas of the hybrid node, wherein the hybrid node is connected to a base station different from a base station to which the more than one neighboring node is connected.

30. The method of claim 29, further comprising:
serving more than one of the plurality of cells via at least one of the plurality of antennas of the hybrid node by transmitting and/or receiving signals corresponding to different cell ids of the more than one cells at the same time.

31. The method of claim 29, further comprising:
utilizing each of the plurality of antennas of the hybrid node for either transmission or reception at any time in a time division duplex (TDD) system.

32. The method of claim 29, further comprising:
utilizing each of the plurality of antennas of the hybrid node for either transmission or reception at any time in a frequency division duplex (FDD) system.

33. The method of claim 29, further comprising:
serving the first cell using the same first cell-id by both the hybrid node and at least one of the neighboring nodes.

34. The method of claim 29, further comprising:
transmitting signals corresponding to the second cell on downlink communication band of the second cell and transmitting signals corresponding to the first cell on the part of the downlink communication band of the first cell that is outside of the downlink communication band of the second cell if the downlink communication bandwidth of the second cell is no greater than the corresponding bandwidth of the first cell.

35. The method of claim 29, further comprising:
using different downlink transmit power spectral densities for communication with the first cell and the second cell.

36. The method of claim 29, further comprising:
using lower transmit power spectral density for downlink transmission for the first cell than the another node that also serves the first cell at the same time.

37. The method of claim 29, further comprising:
using the same transmit power spectral density for downlink transmission for the first cell as the another node that also serves the first cell at the same time.

38. The method of claim 29, further comprising:
using transmit power spectral density that varies over time depending on various parameters.

39. The method of claim 29, further comprising transmitting a common reference signal for the second cell within a second cell bandwidth and a transmitting a dedicated reference signal for the first cell outside the second cell bandwidth.

40. The method of claim 29, further comprising transmitting some first cell signals inside a bandwidth of the second cell and transmitting other first cell signals outside the bandwidth of the second cell, wherein the some signals of the first cell are transmitted such that second cell interference is avoided.

41. A system to support hybrid node deployment in a cellular communication network, comprising:

a hybrid node including a plurality of antennas that simultaneously serve a plurality of cells in the cellular communication network by transmitting or receiving signals corresponding to the plurality of cells at the same time;

a first cell of the plurality of cells having a first cell-id served by the hybrid node, wherein the first cell is a soft cell that maintains communication channels corresponding to the first cell-id covering an area, with antennas of more than one neighboring node at the same time;

a second cell of the plurality of cells having a second cell-id served by the hybrid node, wherein the second cell is a hard cell that maintains communication channels corresponding to the second cell-id, with antennas of only one node at any one time;

wherein each of the first cell and the second cell serves a plurality of user equipment (UEs) for uplink communication to and downlink communication from the hybrid node, wherein downlink and/or uplink communication band of the second cell completely or partially overlaps with downlink and/or uplink communication band of the first cell, and the antennas of the more than one neighboring node are not co-located with the plurality of antennas of the hybrid node, wherein the hybrid node transmits a common reference signal for the second cell within a second cell bandwidth and a dedicated reference signal for the first cell outside the second cell bandwidth.

42. The system of claim 41, wherein:
the common reference signal is a cell-specific reference signal (CRS) in a long-term evolution (LTE) network.

43. The system of claim 41, wherein:
the dedicated reference signal is a UE-specific reference signal (UE-specific RS) or a demodulation reference signal (DM-RS) in a long-term evolution (LTE) network.

* * * * *